UNITED STATES PATENT OFFICE.

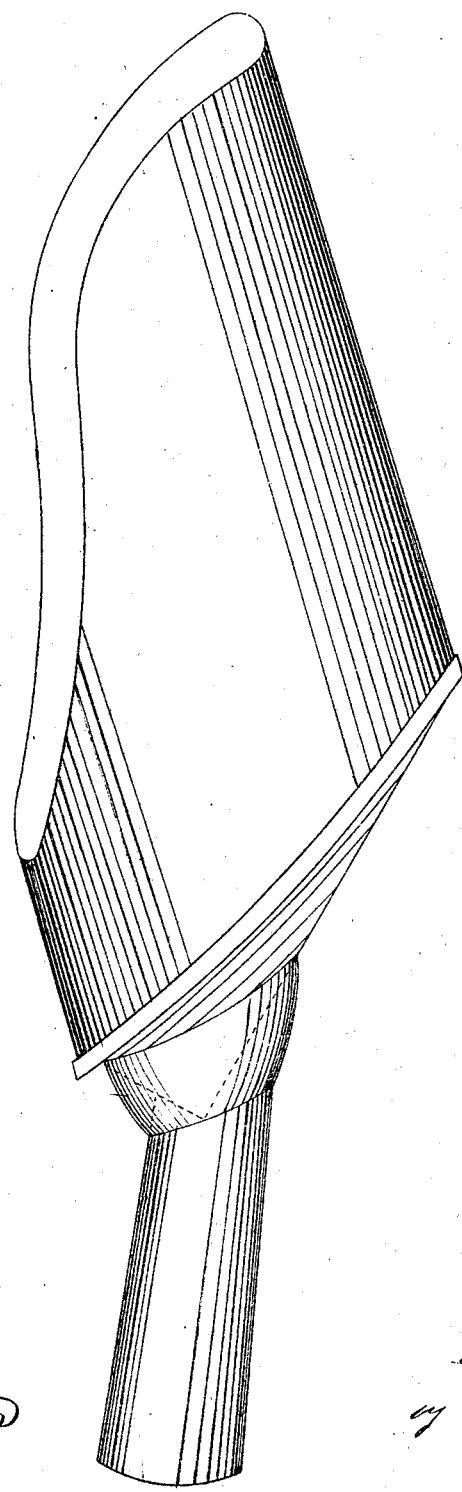

THEODORE C. BROMLEY, OF FORT HOWARD, WISCONSIN.

IMPROVEMENT IN THE CONSTRUCTION OF SCOOPS.

Specification forming part of Letters Patent No. 71,847, dated December 10, 1867.

*To all whom it may concern:*

Be it known that I, THEODORE C. BROMLEY, of Fort Howard, Brown county, Wisconsin, have invented a new and useful Improvement on the Back of a Scoop, which is cone-shaped, which makes the scoop much stronger, and more useful and durable; and I do hereby declare that the following is a full and exact description thereof, reference being had to the accompanying drawings of scoop and separate back.

The nature of my invention consists in making the back of the scoop in the shape of a cone, which makes the scoop much stronger and more durable, and is further strengthened by being braced with a circular raised piece of metal, soldered on the center of the inside of the back.

The scoops are made of tin, sheet-iron, brass, or copper.

What I claim as my invention, and desire to secure by Letters Patent, is—

The cone-shaped back and the circular raised brace.

T. C. BROMLEY.

Witnesses:
    OSCAR GRAY,
    A. GRAY.